(12) United States Patent
Watano (10) Patent No.: US 7,833,444 B2
(45) Date of Patent: Nov. 16, 2010

(54) FINE PARTICLE GRANULATION METHOD

(75) Inventor: Satoru Watano, Osaka (JP)

(73) Assignee: Nara Machinery Co., Ltd., Tokyo (JP)

( * ) Notice: Subject to any disclaimer, the term of this patent is extended or adjusted under 35 U.S.C. 154(b) by 900 days.

(21) Appl. No.: 11/663,817

(22) PCT Filed: Oct. 19, 2005

(86) PCT No.: PCT/JP2005/019830

§ 371 (c)(1),
(2), (4) Date: Mar. 27, 2007

(87) PCT Pub. No.: WO2006/046670

PCT Pub. Date: May 4, 2006

(65) Prior Publication Data

US 2007/0262481 A1    Nov. 15, 2007

(30) Foreign Application Priority Data

Oct. 29, 2004    (JP)    ............................. 2004-316129

(51) Int. Cl.
*B29B 9/00*    (2006.01)
(52) U.S. Cl. ............................................. 264/6; 264/5
(58) Field of Classification Search .................. None
See application file for complete search history.

(56) References Cited

U.S. PATENT DOCUMENTS

| | | | | |
|---|---|---|---|---|
| 4,734,451 A | * | 3/1988 | Smith | 524/493 |
| 2002/0041927 A1 | * | 4/2002 | Nojiri et al. | 427/212 |
| 2003/0054957 A1 | | 3/2003 | Irvin et al. | |
| 2003/0215572 A1 | | 11/2003 | Nojiri et al. | |
| 2006/0138687 A1 | * | 6/2006 | Shekunov et al. | 264/5 |

FOREIGN PATENT DOCUMENTS

JP    A-2004-298721    10/2004

* cited by examiner

*Primary Examiner*—Mary Lynn F Theisen
(74) *Attorney, Agent, or Firm*—Posz Law Group, PLC (57) ABSTRACT

It is an object of the present invention to provide a fine particle granulation method capable of granulating fine particles in an extremely easy operation without the need for carrier particles that cannot be reliably isolated and removed or binders that remain as impurities, and of improving the handling properties of these fine particles, and of obtaining fine particles that can be rapidly broken down into primary particles during use. To achieve this object, the fine particle granulation method comprises an agitation step in which fine particles are dispersed in a supercritical fluid, and a spraying step in which the supercritical fluid with the fine particles dispersed therein is subjected to rapid adiabatic expansion.

25 Claims, 6 Drawing Sheets

FINE PARTICLE GRANULATION METHOD

TECHNICAL FIELD

The present invention relates to a method for granulating fine particles, particularly nano-sized particles with a mean particle size smaller than 1 μm or in other words nanoparticles.

BACKGROUND ART

In general, nanoparticles have a variety of unique properties due to their extremely large specific surface area and surface activity, which derive from their small particle size. This has made it possible to create new materials not available in the past, and there has been much practical research in a variety of fields. Attention has focused in particular on such fields as electronics, coatings, cosmetics and drugs.

However, nanoparticles are difficult to mix uniformly at the primary particle level. Because of their extremely low bulk density, they are difficult to store and transport. Because they are highly reactive, moreover, they may cause dust explosions during mixing and other operations. Nanoparticles also have extremely poor fluidity due to their tendency toward adhesion and aggregation with each other. Another problem is that it is generally difficult to granulate nanoparticles that are hydrophobic and have static properties.

To resolve these problems, Japanese Patent Application Laid-open No. 2003-275281 discloses a method for producing drug-containing composite particles that have improved handling properties while retaining the advantages of nanoparticles, and which are particularly applicable to various pharmaceutical products including drug delivery systems (DDS).

Using the method disclosed in this Japanese Patent Application, at least one of a drug and a biocompatible polymer is made into nanoparticles with a mean particle size of less than 1000 nm, and a mixture comprising these nanoparticles is then processed into a composite by fluidized bed dry pelletization or dry mechanical particle composite processing to produce polymer nano-composite particles. Drug-containing composite particles are thereby produced which have been improved in handling without sacrificing the advantages of nanoparticles, and can be applied favorably to powder transpulmonary preparations and other drug delivery systems.

In the method described in this Japanese Patent Application, aqueous solutions of various biocompatible polymers are used as binders in the specific method of fluidized bed dry pelletization used to process a mixture containing nanoparticles into a composite, and nanoparticles (particles with a mean particle size of less than 1000 nm) are dispersed and suspended in this aqueous solution to produce a liquid raw material which is then sprayed inside a fluidized bed to form micro-sized composite particles.

However, this method uses large amounts of energy to evaporate large amounts of dispersion medium (water in the examples). Moreover, a foreign substance is introduced into the body in this method, even though the polymer used as the binder is biocompatible. Another problem is that because the polymer functions as a binder, it is difficult to subsequently disintegrate and re-disperse the nano-particles.

Moreover, in the other method used to process a mixture containing nanoparticles into a composite in this Japanese Patent Application, dry mechanical particle composite processing, nanoparticle aggregates (0.01 to 500 μm) prepared by the aforementioned method for example are affixed by compression or shearing force to the surface of carrier particles which are larger than the aggregates to thereby form composite particles. It is also described that adhesion between the carrier particles and nanoparticle aggregates is controlled by smoothing the surfaces of the carrier particles in advance or fixing lubricating particles to the surfaces of the carrier particles.

However, because strong compression or shearing force is applied to the nanoparticle aggregates in this method, they may be contaminated due to wearing of the machinery or adhere to the container or the like. The carrier particles also need to be removed for use, but there is no guarantee that they can be reliably removed.

The present invention was devised in light of these problems of prior art to improve the handling properties of nanoparticles. It is an object of the present invention to provide a method capable of granulating fine particles by an extremely easy operation without using carrier particles that cannot be reliably separated and removed or binders that remain as foreign material. Another object is to provide a method of granulating fine particles capable of providing a granulated product that can be rapidly and easily broken down into primary particles.

DISCLOSURE OF THE INVENTION

The inventors and others discovered the following as a result of exhaustive research aimed at achieving these objects. First, it was discovered fine particles maintain good dispersibility even at relatively high dispersion concentrations in a supercritical fluid, and because the supercritical fluid has excellent fluidity and diminished viscosity, a dispersion of fine particles using such a supercritical fluid as the dispersion medium can be sprayed in atmosphere using a nozzle or the like. It was also discovered that the rapid adiabatic expansion due to spraying causes an abrupt temperature drop that in turn causes the supercritical fluid and/or moisture in the atmosphere to condense, and that a granulated product of fine particles can be formed using these condensates as binders. The inventors and others perfected the present invention based on these findings, and called the invention "supercritical freeze granulation".

That is, the supercritical freeze granulation method of the present invention is a fine particle granulation method comprising an agitation step in which fine particles are dispersed in a supercritical fluid, and a spraying step in which the supercritical fluid with the fine particles dispersed therein is subjected to rapid adiabatic expansion.

In preferred embodiments of this invention, the agitation step is performed at a temperature and pressure which are at or above the critical temperature and critical pressure of the supercritical fluid, and at which condensates of the supercritical fluid are produced by rapid adiabatic expansion in the spraying step; a heating step of removing condensates of the supercritical fluid from a granulated product is also performed immediately after the spraying step; supercritical carbon dioxide is used as the supercritical fluid; nano-sized particles with a mean particles size below 1 μm are used as the fine particles for granulation; the fine particles to be granulated are a mixture of two or more types of fine particles; and a dispersion aid, preferably ethanol, is added to the supercritical fluid in the agitation step.

Granulated fine particles can be obtained by an extremely easy operation in the supercritical freeze granulation method of the present invention described above. Because the binder in these granulated particles is made up of condensates of supercritical fluid and/or moisture in the atmosphere generated by rapid adiabatic expansion due to spraying, the binder can be easily removed by subsequent heating or the like to obtain a granulated product that contains no impurities and can be easily broken down into primary particles.

Moreover, granulation is promoted by performing the aforementioned agitation step at a temperature and pressure which are at or above the critical temperature and critical pressure of the supercritical fluid, and at which condensates of the supercritical fluid is produced by rapid adiabatic expansion in the spraying step, resulting in a granulated product with good handling properties. When a heating step is performed immediately after the spraying step to forcibly removed the condensates of the supercritical fluid from the granulated product, the granulated particles do not tend to fuse or aggregate even when packed close together during collection, and can be collected as a granulated product with good fluidity. Using supercritical carbon dioxide as the supercritical fluid allows for an environmentally friendly, energy-efficient granulation method because carbon dioxide is harmless and has a relatively low critical point. Because nanoparticles are particularly difficult to handle, moreover, the effects of granulation are more dramatic when the fine particles to be granulated are nanoparticles with a mean particles size of less than 1 μm. Moreover, while dramatic improvement in fluidity can be achieved even when granulating only one kind of fine particle, granulated particles comprising a uniform mixture of two or more kinds of fine particles can be obtained by using such a mixture of two or more kinds of fine particles as the fine particles to be granulated. Granulated particles with even better fluidity can also be obtained by adding a dispersion aid to the supercritical fluid in the agitation step.

When a drug and excipient for example are granulated by the method of the present invention providing the aforementioned effects, dissolution can be greatly improved. Extremely strong tableting hardness can be obtained when tableting a drug granulated by the method of the present invention. An extremely high delivery rate to the lungs has also been confirmed among other effects when granules produced by the method of the present invention are used in a powder inhalant preparation.

BRIEF DESCRIPTION OF THE DRAWINGS

FIG. 1 is a conceptual view of one example of a device capable of implementing the fine particle granulation method of the present invention.

FIG. 2 is a conceptual view of supercritical carbon dioxide with nanoparticle A and B dispersed therein being sprayed from a nozzle, with (a) showing the state immediately after spraying and (b) the state with the dry ice removed by hot air.

FIG. 3 shows a field emission scanning electron microscope image of granulated particles of titanium dioxide and aluminum oxide.

FIG. 4 indicates the degrees of compression of granulated particles produced from various combinations of raw materials.

FIG. 5 shows the loose bulk density, tapped bulk density and degree of compression of each of the granulated products in relation to temperature.

FIG. 6 investigates the loose bulk density, tapped bulk density and degree of compression of each of the granulated products in relation to pressure.

FIG. 7 shows the funnel speed of each of the granulated products in relation to temperature.

FIG. 8 indicates the funnel speed of each of the granulated products in relation to pressure.

BEST MODE FOR CARRYING OUT THE INVENTION

The fine particle granulation method of the present invention is explained in detail below with reference to drawings and the like.

In the fine particle granulation method of the present invention, fine particles are dispersed in a supercritical fluid in a container or the like in which the temperature and pressure can be controlled, and the supercritical fluid with the fine particles dispersed therein is sprayed from a nozzle or the like, subjecting it to rapid adiabatic expansion and resulting in the formation of a granulated product of fine particles.

A substance has three states (phases)—gaseous, liquid and solid—and the state of a substance can be altered by altering the pressure and temperature. The boundary line between solid and liquid is the melting curve, which shows the relationship between pressure and melting point. The boundary between solid and gaseous is the sublimation curve while the boundary between liquid and gaseous is the evaporation curve, and both show the relationship between vapor pressure and temperature. There is generally a terminal point at the high-temperature, high-pressure end of the evaporation curve, and this is called the critical point. A fluid that is at a temperature and pressure above this critical point is called a supercritical fluid.

The density of a supercritical fluid is close to that of a liquid while its viscosity and diffusion coefficient are close to those of a gas. Because of its high density it can dissolve even in solids and other non-volatile substances, and its high diffusion coefficient should allow for more rapid mass transfer than in a liquid solvent. Since it also has a lower dynamic viscosity (viscosity/density) than a liquid, it is liable to natural convection.

The first feature of the present invention is the use of a supercritical fluid having the properties discussed above as a dispersion medium for fine particles.

That is, in a supercritical fluid fine particles maintain relatively good dispersibility even at relatively high dispersion densities, and because the supercritical fluid has excellent fluidity and diminished viscosity as discussed above, a dispersion of fine particles using such a supercritical fluid as the dispersion medium can be sprayed easily in atmosphere using a nozzle or the like.

The second feature of the present invention is the spraying of a supercritical fluid having the aforementioned fine particles dispersed therein from a nozzle or the like to thereby subject it to rapid adiabatic expansion, resulting in the formation of a granulated product of fine particles.

That is, when a supercritical fluid is sprayed into atmosphere from a nozzle or the like its volume expands rapidly, producing a rapid drop in temperature due to the Joule-Thomson effect, so that the supercritical fluid and/or moisture in the air condenses due to this rapid temperature drop, and a granulated product of fine particles is formed with these condensates as the binder.

Substances that can be used as the supercritical fluid in this invention include carbon dioxide, ammonia, water, alcohol and the like, but of these carbon dioxide is preferred.

This is because carbon dioxide has a critical temperature of 31.3° C. and a critical pressure of 7.38 MPa, lower than those of ammonia (critical temperature 132.3° C., critical pressure 11.28 MPa), water (374.1° C., 22.06 MPa) and the like, making it easier to achieve a supercritical state. Carbon dioxide is also easy to handle because it is chemically stable and noncombustible. It is also cheap and environmentally friendly because it is a naturally occurring substance. Another advantage is that because it is a gas at room temperature and normal pressure, it can be easily removed by restoring normal pressure after completion of the reaction.

The fine particles to be granulated in this invention may be micro-sized particles, but are preferably nano-sized particles with a mean particle size smaller than 1 μm, or in other words nanoparticles.

This is because nanoparticles are particularly difficult to handle in comparison with micro-sized particles, so the effect of the granulation process on handling is particularly dramatic. The substance of the nanoparticles is not particularly limited, and examples include a variety of nano-sized particles including drugs (such as pranlukast hydrate), catalysts (such as titanium oxide), electronic materials (such as barium titanate, PZT and indium tin oxide) and the like.

The fine particles to be granulated may of course be of one kind but may also be a mixture of two or more kinds of fine particles. In this case, the natural convection due to the large diffusion coefficient and low dynamic viscosity (viscosity/density) of the supercritical fluid used as the dispersion medium causes the two or more kinds of fine particles to become uniformly mixed in the supercritical fluid during the agitation process, so that the granulated product formed due to rapid adiabatic expansion when the supercritical fluid with the two or more kinds of fine particles uniformly mixed therein is sprayed from a nozzle or the like is a granulated product having the two or more kinds of fine particles uniformly mixed therein.

In the present invention, a heating step for removing supercritical fluid condensates from the granulated product is preferably included immediately after the spraying step in which the supercritical fluid with the fine particles dispersed therein is subjected to rapid adiabatic expansion.

In fact, the supercritical fluid condensates, such as dry ice for example when the supercritical fluid is supercritical carbon dioxide, can be removed from the granulated product without active heating because dry ice is a gas at room temperature and normal pressure. However, when dry ice remains on the filter when the granulated product is collected for example it can cause fusion and aggregation because the granulated product is closely packed at this stage, so that a granulated product with good fluidity cannot be obtained. Thus, by performing a heating step such as hot air blowing while the granulated product is dispersed at a certain distance immediately after the spraying step, it is possible to efficiently remove supercritical fluid condensates from the granulated product, thus allowing a granulated product with good fluidity to be collected because there is no substance present to cause fusion and aggregation of the granulated product during the collection process.

Moreover, a dispersion aid is preferably added to the supercritical fluid in the present invention.

If the supercritical fluid is subjected to rapid adiabatic expansion without a dispersion aid, large condensates of the supercritical fluid may occur, and a granulated product having these condensates as binders will contain large gaps and will not be a compact granulated product. If a dispersion aid is added, however, the resulting condensates will be smaller, and the resulting granulated product will be compact and have good fluidity. Examples of dispersion aids include ethanol, methanol and other alcohols and toluene, xylene and other aromatic solvents and the like, but ethanol can be used by preference from the standpoint of environmental impact and the like.

Figure 1:
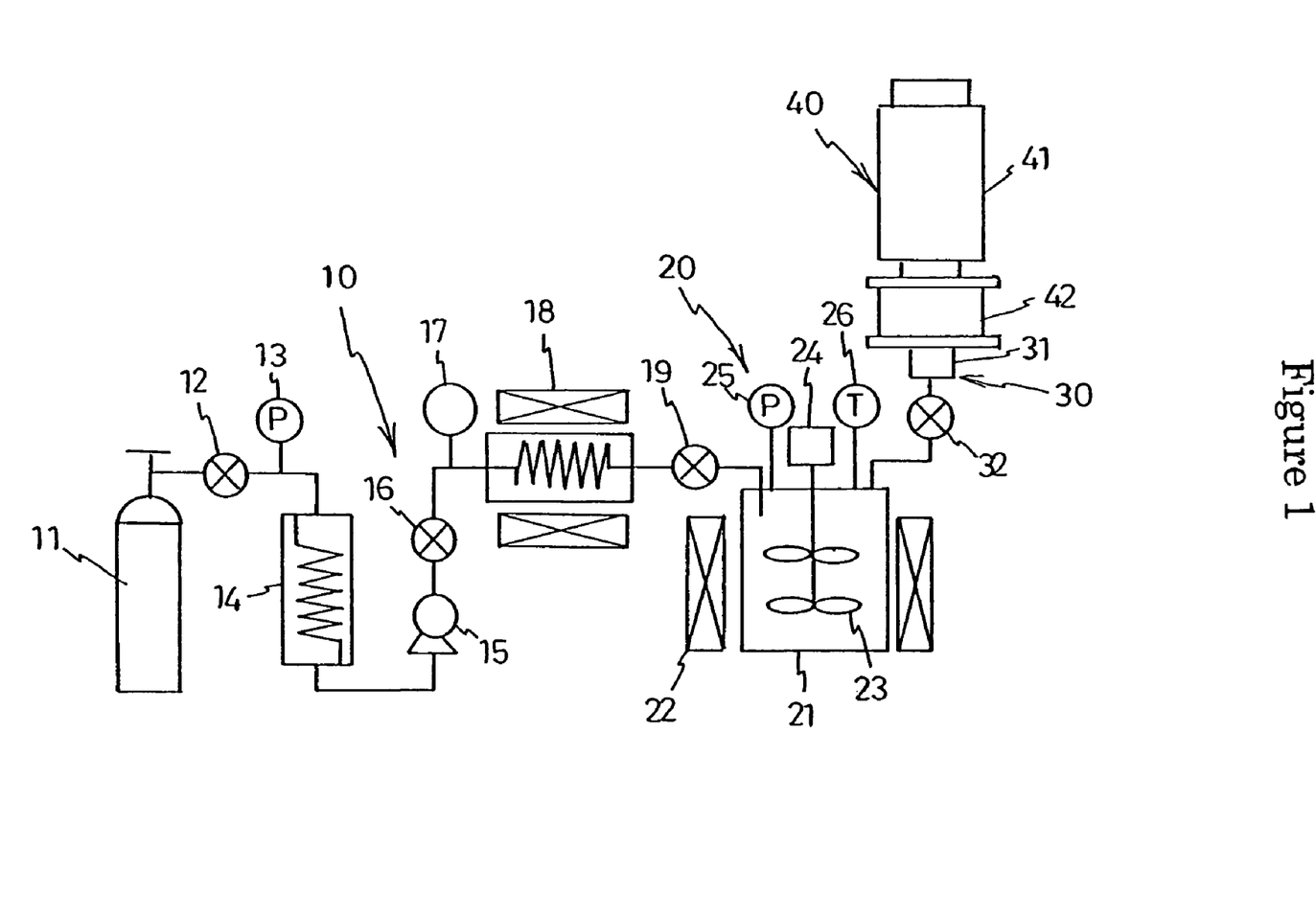

Next, an example of a device capable of implementing the aforementioned fine particle granulation method of the present invention is shown in FIG. 1.

In FIG. 1, the number 10 indicates a supercritical carbon dioxide supply means. This supply means 10 is composed of carbon dioxide cylinder 11, first valve 12, pressure gauge 13, cooling unit 14, high-pressure pump 15, second valve 16, flow meter 17, heater 18 and third valve 19. When first valve 12 is opened carbon dioxide is supplied from cylinder 11 to cooling unit 14, where the carbon dioxide is liquefied. The liquefied carbon dioxide is then sent under pressure by high-pressure pump 15 to heater 18, where it is heated to at or above the critical temperature and critical pressure of carbon dioxide, and carbon dioxide in a supercritical state can then be supplied to the container described below by opening third valve 19.

Flow meter 17 is a coriolis mass flowmeter capable of measuring the density, temperature, flow and integrated flow of a fluid flowing through a pipe.

In the figure, the number 20 indicates an agitation means for dispersing nanoparticles in the supercritical fluid supplied by the aforementioned supply means 10. This agitation means 20 has pressure-resistant container 21, heater 22 for heating pressure-resistant container 21, agitation blades 23 including two pairs of blades, motor 24 for turning agitation blades 23, pressure gauge 25 for measuring the pressure and temperature inside pressure-resistant container 21, and thermometer 26.

Container 21 has a volume of 770 ml and is designed to withstand a maximum of 15 MPa pressure and to be heated to a maximum temperature of 388 K. The maximum rotational speed of agitation blades 23 is 10 rps.

In the figure, the number 30 indicates a means for spraying supercritical fluid. This spray means 30 is composed of nozzle 31, which is equipped with a needle valve for adjusting microflow, and valve 32 for conducting the supercritical fluid to nozzle 31.

In the figure, the number 40 indicates a granulated product collection means. This collection means 40 is composed of collection container (atomizer chamber) 41 surrounding the front of nozzle 31, and may also have connected thereto a cyclone, bag filter or other gas-solid separation means and an exhaust blower (not shown) as necessary. 42 is a hot air supply means below collection container (atomizer chamber) 41, and a fixed amount of gas heated to a fixed temperature is supplied to this hot air supply means 42 from a gas supply unit (not shown).

Nanoparticles are granulated as follows using a device configured as described above.

First, cooling unit 14 for cooling carbon dioxide into a liquid is engaged, first valve 12 is opened to supply carbon dioxide, and the carbon dioxide is cooled to about −20° C. and liquefied.

Next, heater 18 for heating the liquefied carbon dioxide into a supercritical state is engaged, the liquefied carbon dioxide is pressure-fed by high-pressure pump 15 to heater 18, and the carbon dioxide is then heated and pressurized to at or above the critical temperature (31.3° C.) and critical pressure (7.38 MPa) by heater 18 to produce carbon dioxide in a supercritical state.

Next, measured amounts of nanoparticles A and B are placed in container 21, a fixed amount of ethanol is added as necessary as a dispersion aid, and valve 19 is opened to supply supercritical carbon dioxide.

Of course, one type of nanoparticle may be placed in container 21, but two types of nanoparticles (A and B) are used here to ensure the dispersibility of the nanoparticles in the supercritical carbon dioxide.

Next, heater 22 is operated to maintain a fixed temperature and pressure inside container 21, and motor 24 is operated to rotate agitation blades 23 at a fixed rate and disperse nanoparticles A and B in the supercritical carbon dioxide.

After a fixed amount of time, valve 32 is opened and the supercritical carbon dioxide with the nanoparticles dispersed therein is sprayed from nozzle 31 into collection chamber (atomizer chamber) 41.

Figure 2:
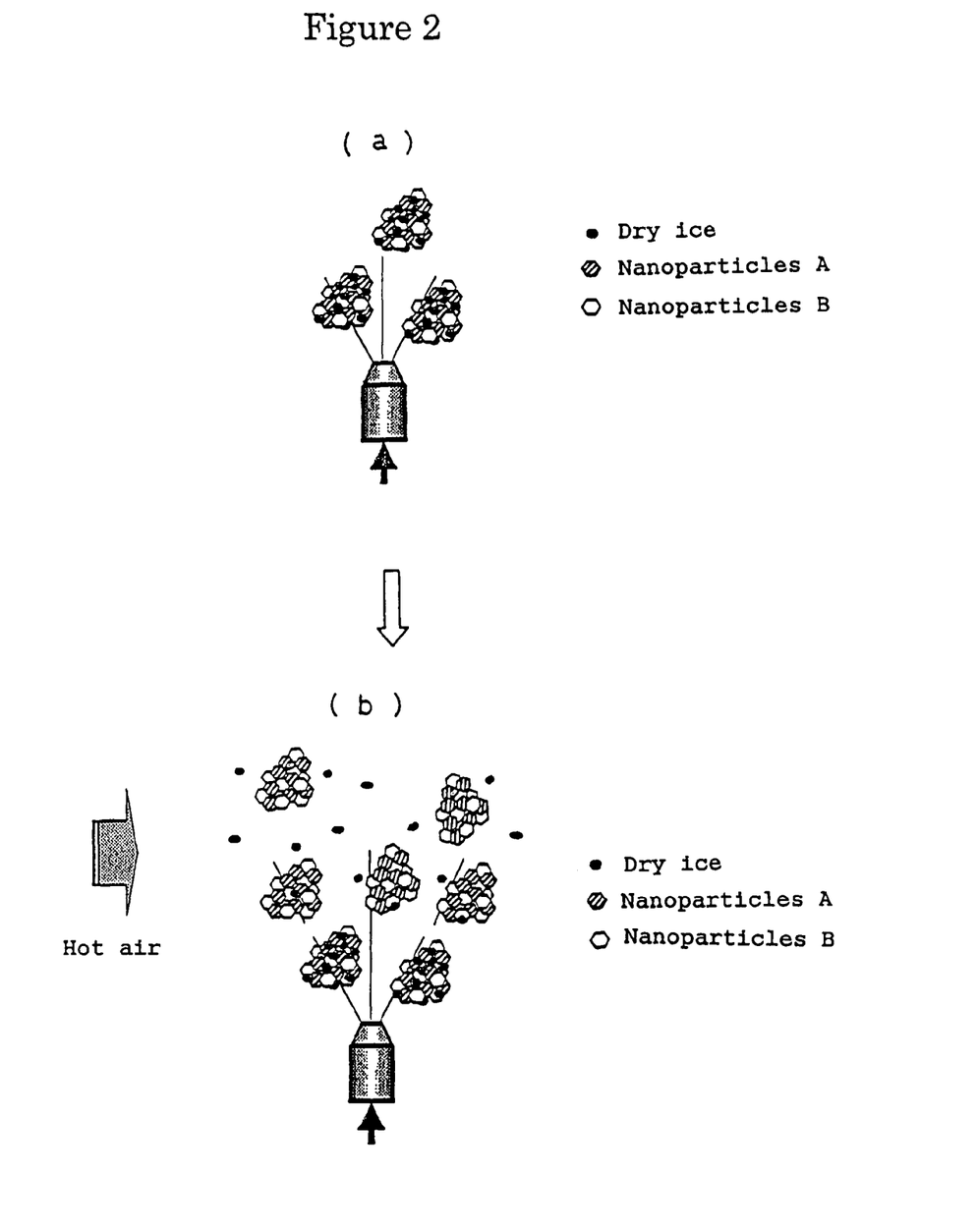

At this stage, the temperature drops rapidly due to the Joule-Thomson effect as the supercritical carbon dioxide sprayed from nozzle 31 expands rapidly in volume, and this temperature drop causes the supercritical carbon dioxide to condense into dry ice or causes moisture in the surrounding atmosphere to condense into ice, forming a granulated product of nanoparticles A and B with the condensates as binders as shown in FIG. 2(*a*).

Because hot air (at 200° C. for example) is also being supplied via hot-air supply means 42 above nozzle 31, after acting as a binder the dry ice is instantly sublimated and removed from the granulated product as shown in FIG. 2(*b*).

The carbon dioxide sublimated from the dry ice is expelled outside the system together with the hot air, and the granulated product with the dry ice removed, which has a porous structure consisting only of nanoparticles with partial gaps, is collected in collection chamber (atomizer chamber) 41.

The collected granulated product is affected by the added amount of dispersion aid (ethanol or the like), the temperature and pressure of the supercritical carbon dioxide during spraying and the nozzle diameter and the like, but general has a mean particle size of tens to hundreds of μm.

Test examples supporting the various effects of the granulation method of the present invention are described below.

Raw Materials

Titanium dioxide ($TiO_2$), aluminum oxide ($Al_2O_3$) and silicon dioxide ($SiO_2$) nanoparticles manufactured by Japan Aerosil were used as the fine particles for granulation. The properties of the raw materials are shown in Table 1.

TABLE 1

| | Raw material | | |
|---|---|---|---|
| | Titanium dioxide ($TiO_2$) | Aluminum oxide ($Al_2O_3$) | Silicon dioxide ($SiO_2$) |
| Grade | P25 | AluC | R974 |
| Molecular weight | 79.9 | 101.9 | 60 |
| Mean particle size | 21 nm | 13 nm | 12 nm |

TEST EXAMPLE I

Two of the three types of raw materials listed in Table 1 above were selected, and 2.5 g of each was measured and placed in the container 21 shown in FIG. 1. 5 g of ethanol was added as a dispersion aid, supercritical carbon dioxide was supplied, and agitation blades 23 were operated for 10 minutes at 10 rps with the pressure maintained as shown in Table 2 to disperse the nanoparticles of each raw material in the supercritical carbon dioxide.

Next, the supercritical carbon dioxide with the nanoparticles dispersed therein was sprayed from nozzle 31 (bore 6.4 mm) into collection container (atomizer chamber) 41, and the resulting granulated product was collected.

Hot air at 200° C. was also supplied from hot-air supply means 42 near the outlet of nozzle 31 to remove from the granulated product the dry ice generated by rapid adiabatic expansion due to spraying.

For purposes of comparison, 2 g of ethanol was added to 0.5 g each of the titanium dioxide and aluminum oxide shown in Table 1, and these were thoroughly mixed by hand and dried to obtain the mixture of Test Example I-4.

TABLE 2

| | Test Example I-1 | Test Example I-2 | Test Example I-3 |
|---|---|---|---|
| Raw material combination | $TiO_2 + SiO_2$ | $TiO_2 + Al_2O_3$ | $SiO_2 + Al_2O_3$ |
| Bulk density (g/ml) | 0.0714 | 0.0714 | 0.0500 |
| Pressure (MPa) | | 10 | |
| Temperature (K.) | | 313 | |

Evaluation

Electron Microscope Evaluation of Granulated Products

When granulated products obtain from each combination of raw materials were observed under a field emission scanning electron microscope (JEOL Ltd. JSM-6700F), the granulated product of Test Example I-2 ($TiO_2+Al_2O_3$) comprised particles 100 to 150 μm in size.

The granulated products of Test Examples I-1 ($TiO_2+SiO_2$) and I-3 ($SiO_2+Al_2O_3$) comprised particles 30 to 60 μm in size.

This shows that a granulated product of nanoparticles can be formed by dispersing nanoparticles in supercritical carbon dioxide, and then subjecting the supercritical carbon dioxide with the nanoparticles dispersed therein to rapid adiabatic expansion.

Few aggregates were seen in any of the granulated products. This shows that the nanoparticles are uniformly dispersed in the supercritical carbon dioxide during the step of agitating the nanoparticles and supercritical carbon dioxide.

Figure 3:
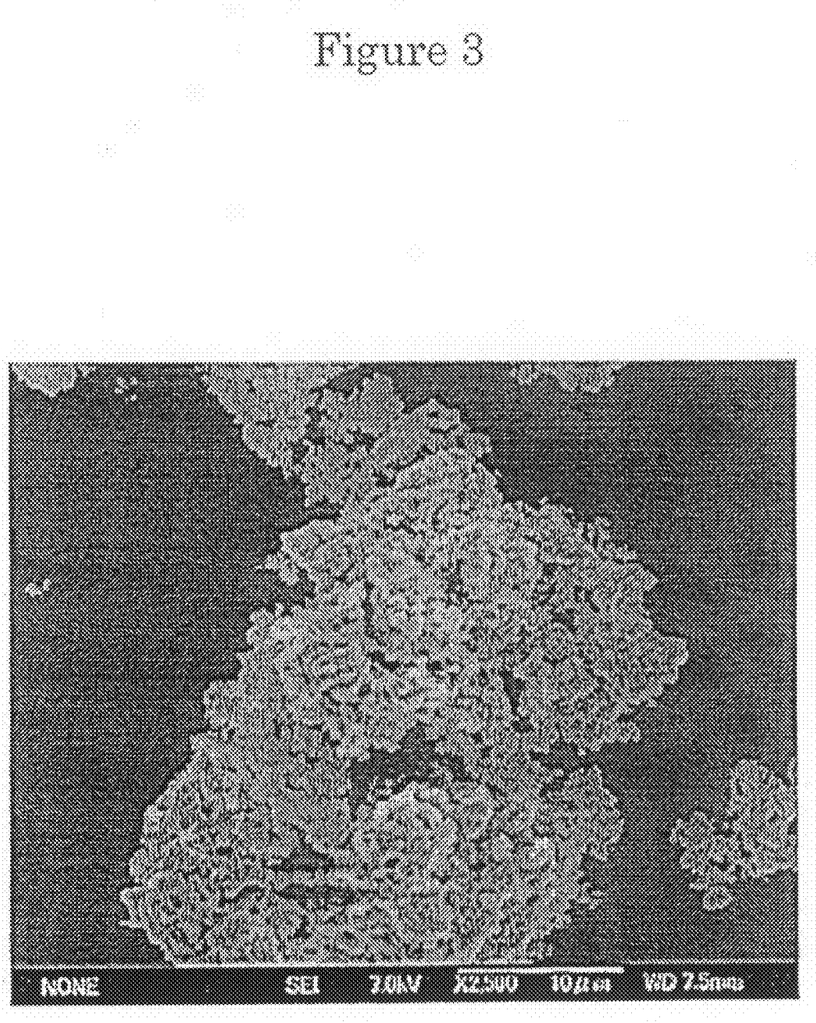

The granulated products also had porous structures (see field emission scanning electron microscopic image of granulated product of titanium dioxide and aluminum oxide, FIG. 3), suggesting that the condensates of supercritical carbon dioxide (dry ice) were removed by sublimation after having acted as binders in the production of the granulated products.

Evaluation of Mixing by X-Ray Analyzer

When the granulated products obtained from various combinations in Test Examples I-1 through I-3 and the mixture obtained by hand mixing in Test Example I-4 were subjected to elemental analysis using an energy dispersion X-ray analyzer (JEOL LTD. EX-23000 BU) to evaluate the mixed state of the two types of nanoparticles, the hand-mixed mixture of Test Example I-4 was a mixture of aggregates of raw material particles, while the granulated products of Test Example I-1 through I-3 were uniformly mixed at least on the order of submicron-sized particles (limit of analysis).

This shows that with the granulation method of the present invention it is possible to obtain a granulated product in which nanoparticles are uniformly mixed together, something that has been difficult to accomplish in the past. It is believed that because the supercritical carbon dioxide has a high diffusion coefficient and a lower dynamic viscosity than liquids or gases, it is liable to natural convection which causes the nanoparticles to move about actively and become uniformly mixed as a result.

Evaluation of Fluidity According to Degree of Compression.

Figure 4:
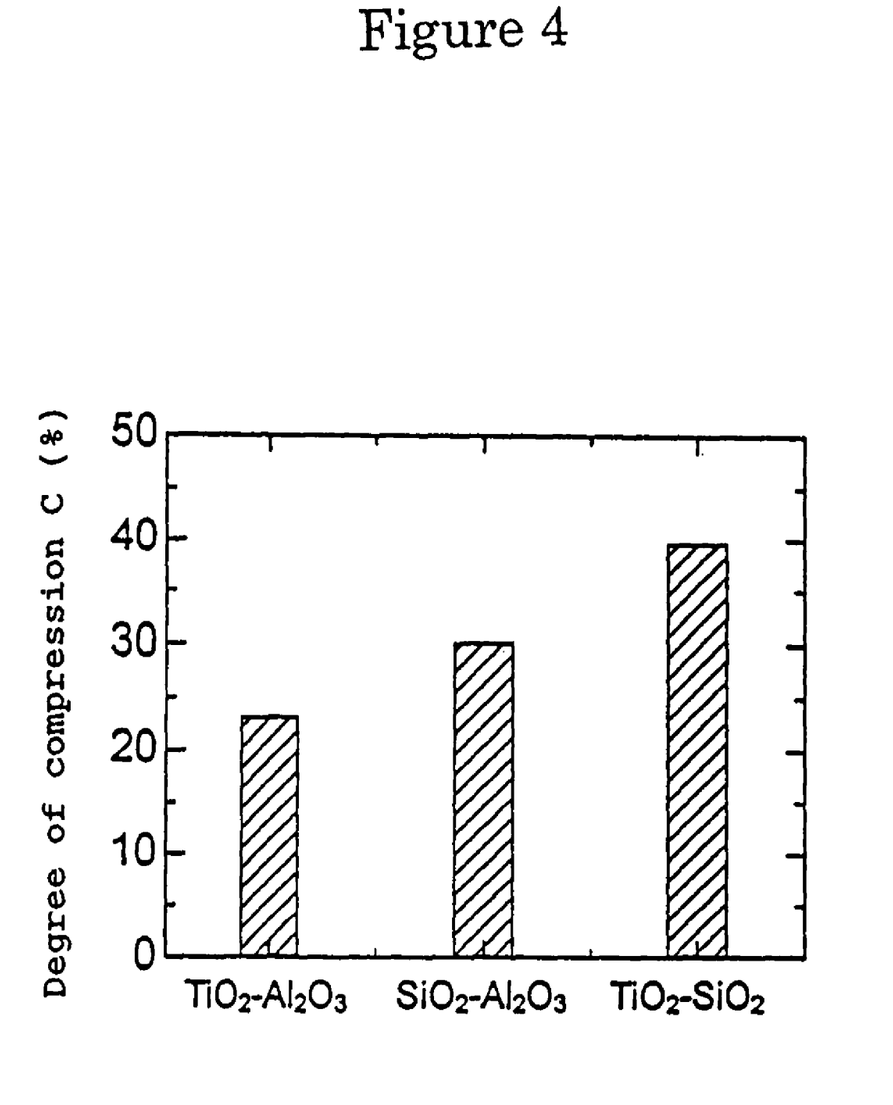

A measured mass of each granulated product was placed in a measuring cylinder, and the loose bulk density A was calculated from the volume. Measuring cylinders containing each granulated product were then tapped for 3 minutes at a rate of once a second using a powder tester (Hosokawa Micron Corp., PT-E), and a value calculated from the volume was taken as the tapped bulk density P. Degree of compression C was then calculated by Formula (1) below from these values. The calculated results for this degree of compression C are shown in FIG. 4.

Loose bulk density A and tapped bulk density P were both measured five times, and the average of these values was used to calculate degree of compression C.

$$C=100(P-A)/P \quad (1)$$

This calculated degree of compression C is a benchmark of fluidity, with C being smaller in the case of granulated products with good fluidity. Consequently, judging from FIG. 4 it appears that the granulated product of Test Example I-2 ($TiO_2+Al_2O_3$) has the smallest C value, and consequently that the granulated product obtained from a combination of titanium oxide and aluminum oxide nanoparticles in Test Example I-2 has the best fluidity.

TEST EXAMPLE II

This test examined how the temperature and pressure during the step of agitating the nanoparticles and supercritical carbon dioxide affect the resulting granulated product. To test this, the temperature and pressure during the agitation step with the supercritical carbon dioxide were varied as shown in Tables 3 and 4 using the combination of titanium dioxide and aluminum oxide, which exhibited the best fluidity in the aforementioned fluidity evaluation. The other conditions were the same as in Test Example I above.

TABLE 3

|  | Test Ex. II-1 | Test Ex. II-2 | Test Ex. II-3 | Test Ex. II-4 |
|---|---|---|---|---|
| Combination of raw materials | $TiO_2 + Al_2O_3$ | | | |
| Pressure (MPa) | 15 | | | |
| Temperature (K.) | 313 | 323 | 333 | 343 |

TABLE 4

|  | Test Ex. II-5 | Test Ex. II-6 | Test Ex. II-7 | Test Ex. II-8 |
|---|---|---|---|---|
| Combination of raw materials | $TiO_2 + Al_2O_3$ | | | |
| Pressure (MPa) | 8 | 10 | 12 | h h h 15 |
| Temperature (K.) | 313 | | | |

Evaluation

Measurement of Compression

Figure 5:
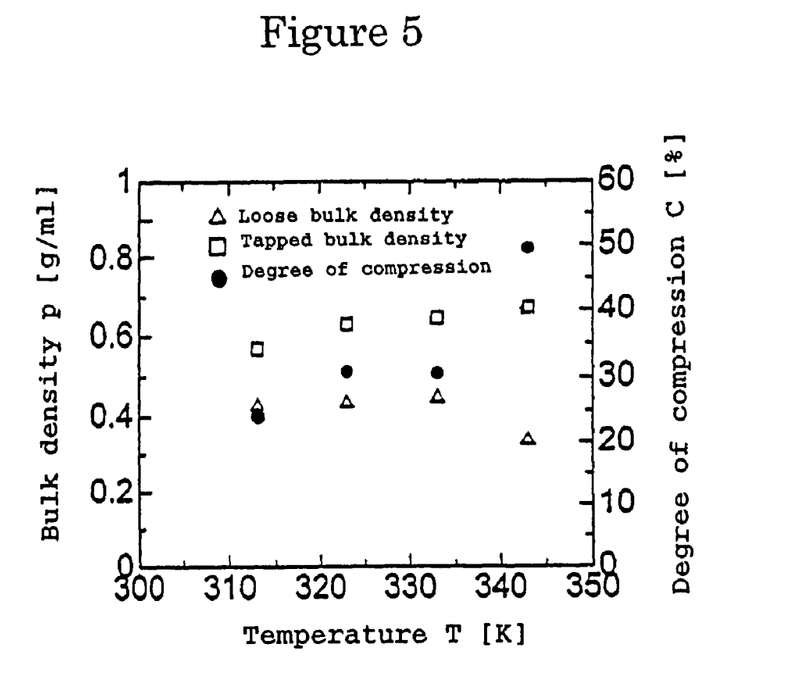
Figure 6:
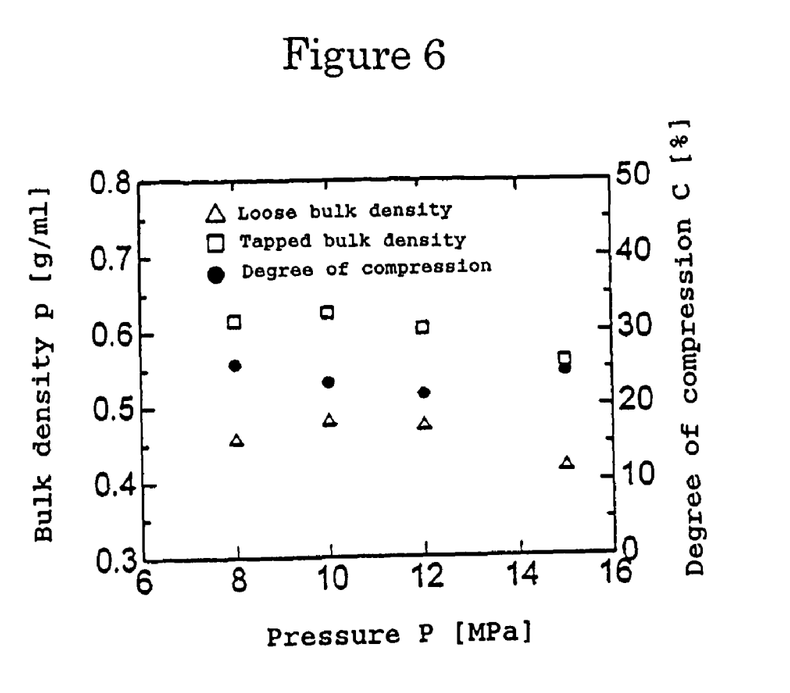

The loose bulk density, tapped bulk density and degree of compression of each of the granulated products of Test Examples II-1 through II-8 were measured by the methods used previously. The results are shown in FIGS. 5 and 6 in relation to both temperature in pressure.

Measurement of Funnel Time

Funnel time was adopted as a measurement for evaluating fluidity of the granulated product.

Figure 7:
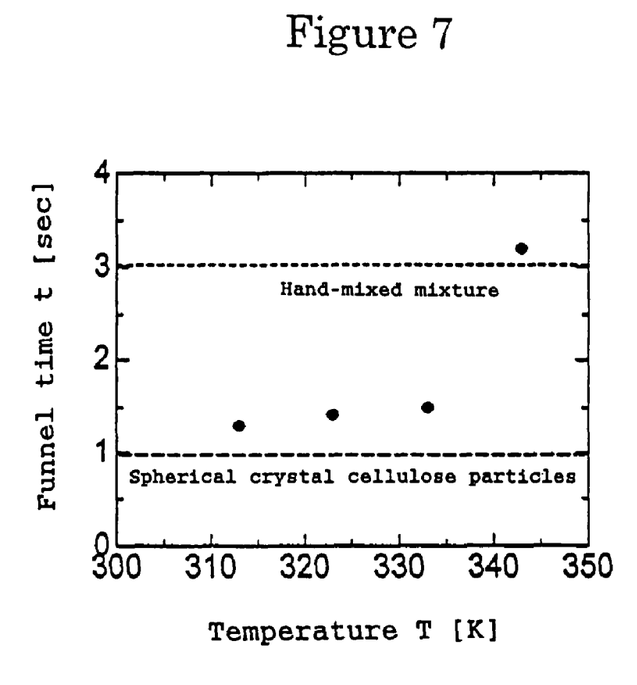
Figure 8:
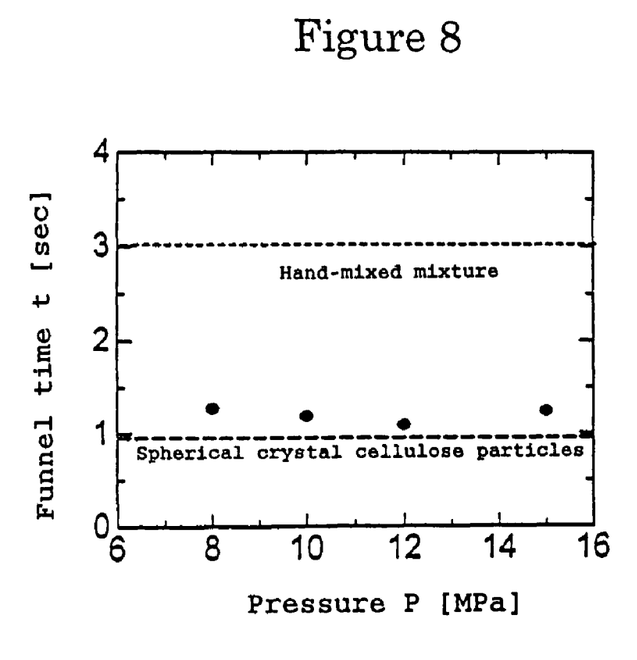

Funnel time was measured by filling glass funnels with 0.35 g of each of the granulated products, letting them descend while applying oscillation with a powder tester (Hosokawa Micron Corp., PT-E), and measuring the time taken for the granulated product to be completely discharged from the funnel. The measurement results are shown in FIGS. 7 and 8 in relation to temperature and pressure, respectively.

Funnel time was measured 15 times with respect to each granulated product, and the calculated average was taken as the funnel time of the granulated product.

Funnel time was also evaluated by the same methods using spherical crystal cellulose particles having good fluidity (Asahi Kasei, Celphere 100, particle size 100 μm) and the hand-mixed mixture prepared in Test Example I-4 above. The measurement results are shown with dotted lines in FIGS. 7 and 8.

Evaluation of Fluidity, etc.

It can be seen from FIGS. 7 and 8 that the granulated products formed by the method of the present invention have extremely good fluidity and improved handling properties even in comparison with highly-fluid spherical crystal cellulose particles and the hand-mixed mixture of Test Example I-4.

FIGS. 5 and 7 show that as the temperature rises, compression increases and the funnel time also increases. In particular, compression and funnel time are dramatically higher at 343 K. This is because the lower the temperature, the lower the temperature to which the supercritical fluid falls after being sprayed in atmosphere. Consequently, it is thought that operating at a lower temperature promotes granulation and results in better fluidity because dry ice is produced more easily by condensation of the supercritical carbon dioxide.

FIGS. 6 and 8 show that changing the pressure produces no great difference in compression or funnel time, with good fluidity being obtained in all cases. This is attributed to the fact that the temperature of the supercritical carbon dioxide was 313 K during mixing with the nanoparticles in all tests, so that the temperature after spraying in atmosphere fell to a temperature sufficiently low to produce enough dry ice even at different pressures.

Evaluation of Disintegration

The granulated products of Test Examples II-1 through II-8 could all be easily disintegrated with the fingertips. Each granulated product also disintegrated extremely quickly when 0.1 g was agitated in a beaker containing 50 ml of distilled water.

This shows that a granulated product produced by the method of the present invention easily breaks down into primary particles.

INDUSTRIAL APPLICABILITY

A granulated product of fine particles can be obtained by an extremely easy operation using the fine particle granulation method of the present invention explained above. Moreover, because the binder of this granulated product is a condensate of supercritical fluid and/or moisture in air produced by rapid adiabatic expansion due to spraying, this binder can be easily removed by subsequent heating or the like, resulting in a granulated product that is free of impurities and breaks down easily into primary particles. Consequently, the fine particle granulation method of the present invention can be applied favorably to a variety of fields involving fine particles, including in particular electronics, coatings, cosmetics, pharmaceuticals and the like.

The invention claimed is:

1. A fine particle granulation method, comprising:
   an agitation step in which fine particles are dispersed in a supercritical fluid; and
   a spraying step in which the supercritical fluid with said particles dispersed therein is subjected to rapid adiabatic expansion.

2. The fine particle granulation method according to claim 1, wherein said agitation step is performed at a temperature and pressure which are at or above the critical temperature and critical pressure of the supercritical fluid, and at which condensates of the supercritical fluid are produced by rapid adiabatic expansion in said spraying step.

3. The fine particle granulation method according to claim 1, wherein said supercritical fluid is supercritical carbon dioxide.

4. The fine particle granulation method according to claim 1, wherein said fine particles are nano-sized fine particles with a mean particle size of less than 1 μm.

5. The fine particle granulation method according to claim 1, wherein said fine particles are a mixture of two or more kinds of fine particles.

6. A fine particle granulation method, comprising:
   an agitation step in which fine particles are dispersed in a supercritical fluid;
   a spraying step in which the supercritical fluid with said particles dispersed therein is subjected to rapid adiabatic expansion; and
   a heating step of removing condensates of the supercritical fluid from a granulated product immediately after said spraying step.

7. The fine particle granulation method according to claim 6, wherein said agitation step is performed at a temperature and pressure which are at or above the critical temperature and critical pressure of the supercritical fluid, and at which condensates of the supercritical fluid are produced by rapid adiabatic expansion in said spraying step.

8. The fine particle granulation method according to claim 6, wherein said supercritical fluid is supercritical carbon dioxide.

9. The fine particle granulation method according to claim 6, wherein said fine particles are nano-sized fine particles with a mean particle size of less than 1 μm.

10. The fine particle granulation method according to claim 6, wherein said fine particles are a mixture of two or more kinds of fine particles.

11. A fine particle granulation method, comprising:
    an agitation step in which fine particles are dispersed in a supercritical fluid; and
    a spraying step in which the supercritical fluid with said particles dispersed therein is subjected to rapid adiabatic expansion,
    wherein a dispersion aid is further added to the supercritical fluid in said agitation step.

12. The fine particle granulation method according to claim 11, wherein said agitation step is performed at a temperature and pressure which are at or above the critical temperature and critical pressure of the supercritical fluid, and at which condensates of the supercritical fluid are produced by rapid adiabatic expansion in said spraying step.

13. The fine particle granulation method according to claim 11, wherein said supercritical fluid is supercritical carbon dioxide.

14. The fine particle granulation method according to claim 11, wherein said fine particles are nano-sized fine particles with a mean particle size of less than 1 μm.

15. The fine particle granulation method according to claim 11, wherein said fine particles are a mixture of two or more kinds of fine particles.

16. A fine particular granulation method, comprising:
    forming a dispersion of fine solid particles in a supercritical fluid by agitating the fine solid particles in the supercritical fluid, and
    spraying the dispersion of fine solid particles in the supercritical fluid and subjecting said particles therein to rapid adiabatic expansion.

17. The fine particle granulation method according to claim 16, wherein said agitation step is performed at a temperature and pressure which are at or above the critical temperature and critical pressure of the supercritical fluid, and at which condensates of the supercritical fluid are produced by rapid adiabatic expansion in said spraying step.

18. The fine particle granulation method according to claim 16, wherein said supercritical fluid is supercritical carbon dioxide.

19. The fine particle granulation method according to claim 16, wherein said fine particles are nano-sized fine particles with a mean particle size of less than 1 μm.

20. The fine particle granulation method according to claim 16, wherein said fine particles are a mixture of two or more kinds of fine particles.

21. A fine particle granulation method, comprising:
    an agitation step in which fine particles are dissolved in a supercritical fluid;
    a spraying step in which the supercritical fluid with said particles dispersed therein is subjected to rapid adiabatic expansion; and
    a granulating step where the sprayed particles granulate into grains by using condensed particles, the condensed particles including at least one of condensed particles of the supercritical fluid and condensed particles of atmospheric moisture.

22. The fine particle granulation method according to claim 21, wherein said agitation step is performed at a temperature and pressure which are at or above the critical temperature and critical pressure of the supercritical fluid, and at which condensates of the supercritical fluid are produced by rapid adiabatic expansion in said spraying step.

23. The fine particle granulation method according to claim 21, wherein said supercritical fluid is supercritical carbon dioxide.

24. The fine particle granulation method according to claim 21, wherein said fine particles are nano-sized fine particles with a mean particle size of less than 1 μm.

25. The fine particle granulation method according to claim 21, wherein said fine particles are a mixture of two or more kinds of fine particles.

* * * * *